(No Model.)
N. K. JONES.
CUTTER HEADS FOR CARVING SCROLLS.
No. 275,391. Patented Apr. 10, 1883.
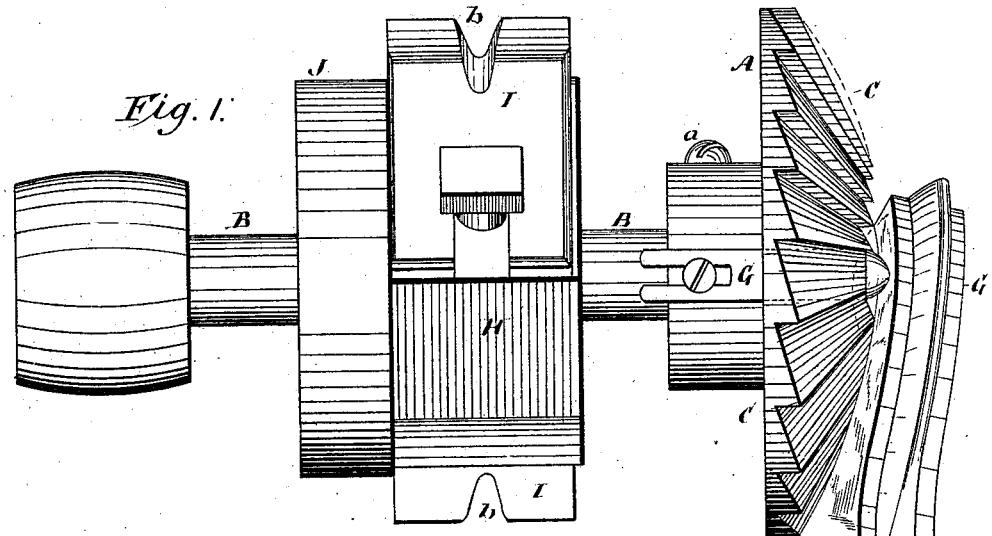
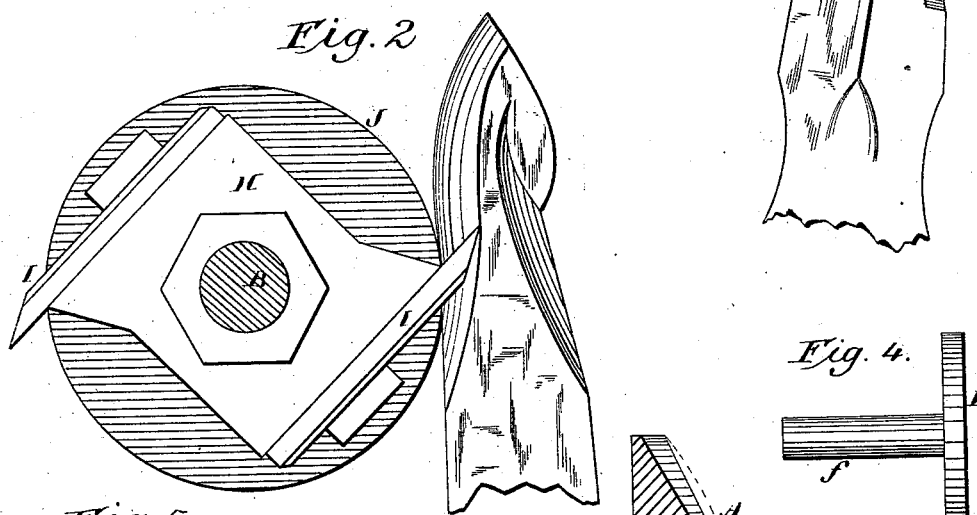
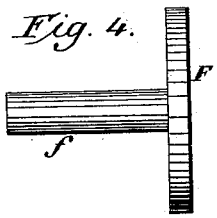
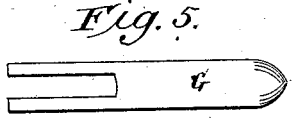
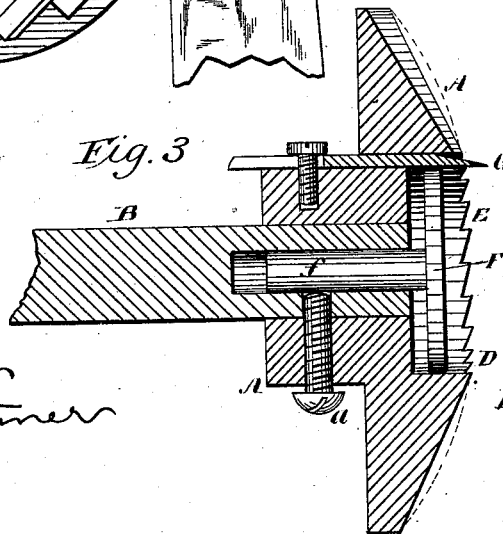
Attest.
C. J. Belt
A. M. Tanner
Inventor
Norman K. Jones,
By
Painer Lodd,
Attorneys.

UNITED STATES PATENT OFFICE.

NORMAN K. JONES, OF YOUNGSTOWN, OHIO.

CUTTER-HEAD FOR CARVING SCROLLS.

SPECIFICATION forming part of Letters Patent No. 275,391, dated April 10, 1883.

Application filed January 25, 1883. (No model.)

*To all whom it may concern:*

Be it known that I, NORMAN K. JONES, a citizen of the United States, residing at Youngstown, in the county of Mahoning and State of Ohio, have invented certain new and useful Improvements in Devices for Carving Scrolls on Carriage Wood-Work; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to furnish a device for cutting or carving scrolls or ornamental beads or moldings on the ends of spring-bars, head-blocks, side bars, and other carriage wood-work.

The invention consists in the construction and combination of parts which will hereinafter be more fully described, and then set forth in the claims.

In the drawings, Figure 1 is a side elevation, showing the combination of scroll-carving head and molding or beading cutter. Fig. 2 is a cross-section, showing the molding-cutter. Fig. 3 is a longitudinal section of the scroll-carving head having an open center and adjustable disk fitted therein. Figs. 4 and 5 are detail views of the adjustable center disk and cutting-spur of the scroll-carving head.

The letter A designates a circular head, which is generally secured to a mandrel or shaft, B, placed in a horizontal position and turning in suitable bearings. The mandrel, however, may be arranged vertically and the head A mounted on the end of the same. The front or working face of the head A is made either straight or convex, according to the kind of work to be executed, and has a series of radial cutters, C, which extend from the open circular center D of the head to the periphery of the latter. The cutters C extend in a continuous or unbroken line around the open center D, so as to form an annular saw, E, for the object hereinafter stated. A circular disk, F, fitted in the open center or circular cavity of the head A, has a suitable stem, *f*, which lies in a bore of the mandrel B, and is held therein by a set-screw, *a*, passing through the hub of the head A and the mandrel, as is shown in Fig. 3.

The adjustment of the disk in the open center D may be effected by other means than the stem and set-screw above referred to. For example, the disk may have one or more slotted plates, which lie in grooves made in the hub of the head A and slots made in the latter, screws passing through said slotted plate or plates serving to hold the disk in a stationary position.

A cutting-spur, G, made on the end of a suitable plate or shank that projects through the head A and lies in a groove in the hub thereof, is flush with the periphery or wall of the circular cavity or open center of the disk, and projects beyond the annular saw E, for the purpose hereinafter stated. In rear of the carving-head A is located an auxiliary head, H, of a square or other form, which carries two notched cutters or knife-plates, I. These cutters are shaped like plane irons or bits, except that they have the notches *b*, which are of a U shape, and they are made adjustable to regulate the depth of the cuts, as is shown in Fig. 1. The guide or collar J, for the pattern to work against, forms part of the head H or is constructed separate therefrom.

Having thus described the construction of my device or tool, I will now proceed to state the *modus operandi* thereof.

In order to cut the customary side scrolls and so-called "eye" on the sides of a spring-bar, head-block, or other object, I present the latter to the rapidly-rotating cutter-head, which then cuts a curved or scroll-shaped recess in the side of the bar or pattern, while the saw, disposed around the open center of the cutter-head, cuts into the wood in such a manner that an eye or bead of an elliptical shape is left at the bottom of the scroll. The formation of this eye or bead projecting beyond the surface of the scroll-shaped cut is permitted by the open center of the cutter-head, since said open center receives the wood forming the eye and permits the cutters on the surface of the head to cut the scroll-shaped design. The cutting-spur G follows the saw-teeth after the eye has been formed and planes off the surface of the latter. After the sides of the bar or other object have been properly carved, the same is presented in a vertical position to the notched cutters for the purpose of raising a bead or molding on the top of the bar. It will be obvious that this bead or molding is rounded off, and that the ledges at the sides of the bead are planed off smooth by the parts of the cutters at the sides of the notched center. The adjustable disk determines the depth of the eye cut by the head. The scroll-cutting head may be used apart from the molding-cutter on any suitable machine.

I am aware that rotary cutters for carving wood-work or cutting various ornamental designs are not broadly new; and I also know that notched rotary cutters have heretofore been used for raising beads or moldings. I am not aware, however, that a cutter-head or device adapted for the special work described by me has ever been constructed. Hence,

I claim as new and desire to secure by Letters Patent—

1. A rotary cutter-head having a series of radial cutters, an open center or circular cavity, and an annular saw formed by the inner edges of the radial cutters surrounding said cavity, substantially as herein set forth.

2. A rotary cutter-head having a series of radial cutters on its face, an open center or circular cavity, an annular saw surrounding said cavity, and a planing spur or knife projecting beyond said saw, as and for the purpose set forth.

3. The device for cutting scrolls and beads on carriage wood-work herein described, comprising the following instrumentalities, viz: a rotary mandrel, a circular head having radial face-cutters, an open center or circular cavity, an adjustable disk fitted into the latter, annular saw-teeth surrounding said cavity, a planing cutter or spur projecting beyond the saw-teeth, and notched bead-forming cutters arranged on the mandrel, as and for the purpose herein set forth.

In testimony whereof I affix my signature in presence of two witnesses.

NORMAN K. JONES.

Witnesses:
GEO. ORMSBY,
JOHN B. ZIEGLER.